Inventor:
William K. Rab,
by Arthur D. Thomson
Attorney 3,295,408
OPTICAL APPARATUS FOR ADJUSTING COPY-TO-IMAGE RATIOS IN GRAPHIC ARTS PHOTOGRAPHY
William K. Rab, Newton Highlands, Mass., assignor to Multiprint, Inc., Boston, Mass., a corporation of Massachusetts
Filed June 16, 1964, Ser. No. 375,453
6 Claims. (Cl. 88—24)

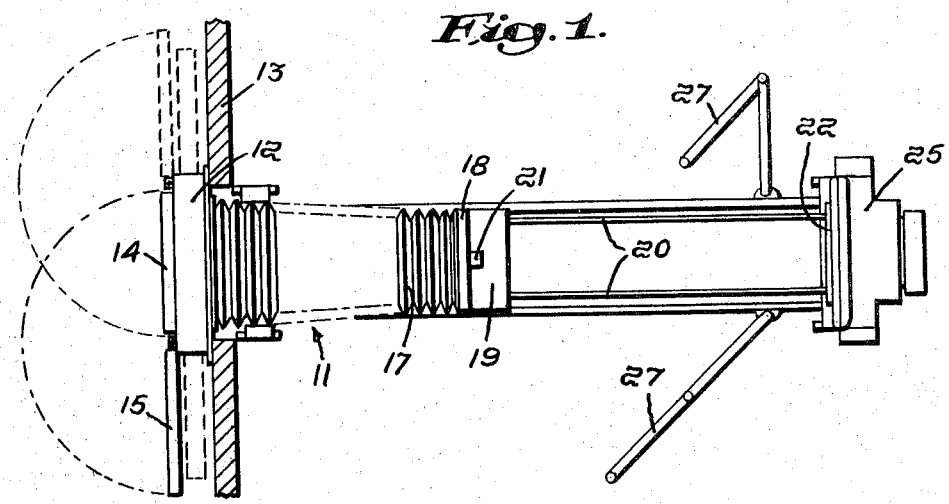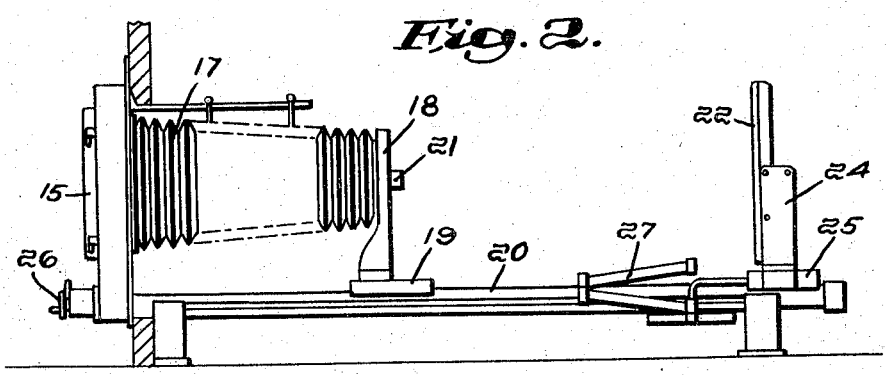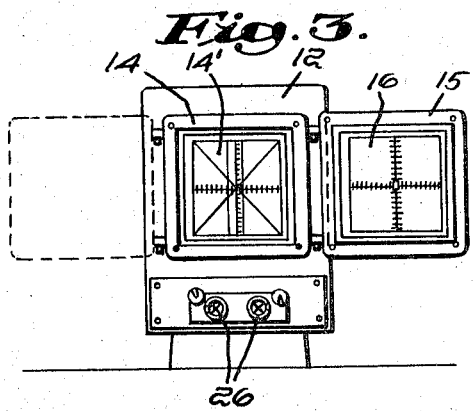

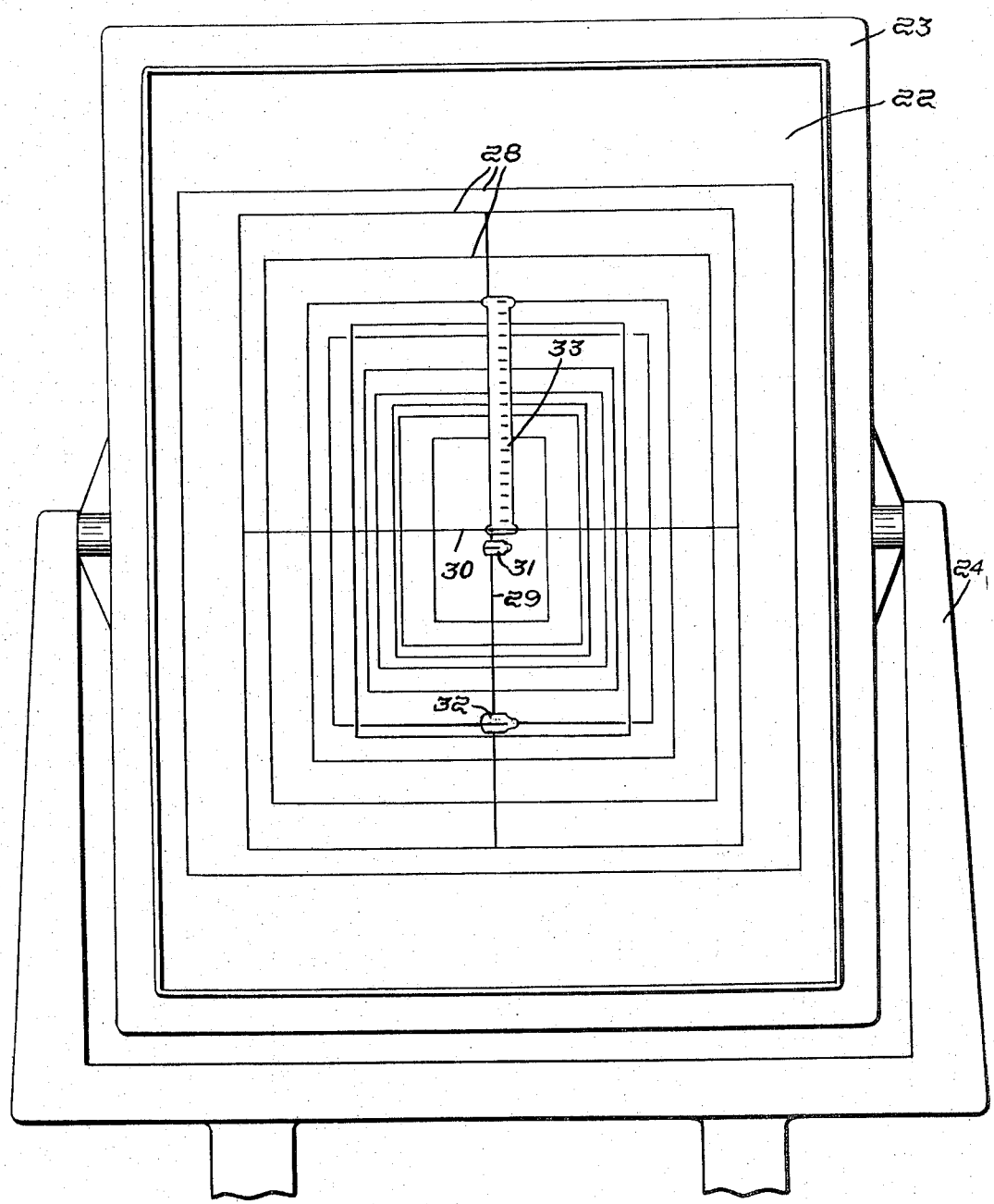

This invention relates to improvements in cameras used in the graphic arts, and pertains more specifically to a means of adjusting such cameras for copy enlargements, reductions, and reproductions of the same size.

The principal purpose of the invention is to provide a rapid, repeatable, and accurate optical mode of determining the relative distances between the plane of the copy to be photographed, the plane of the lens, and the plane of the focusing ground glass, such that the resulting photograph will provide an image in a desired ratio to the original copy, irrespective of the focal length of the camera lens.

Typical purposes and advantages of the invention will be described herein, while additional applications may be obvious or learned through experience.

The improved apparatus may be used with any conventional engraving, photomechanical, or color-process camera which is equipped with a ground glass or focusing sheet used in conjunction with a separate film holder, and which has the usual manual or mechanical means for adjusting the vertical and lateral position of the camera lens in its normal plane for the fine positioning of the copy image on the ground glass. Such cameras normally comprise a lensboard slidable along tracks on which a copyholder is also slidable, and mechanism by which the longitudinal extensions of the lensboard and copyholder may be regulated by turning cranks or wheels located at the rear of the camera. The tracks sometimes have marked scales, which are read at one side of the camera, to designate the relative positions of the lensboard and copyholder, in accordance with computations made with respect to a lens of a specific focal length, and intended to indicate the settings for photographic proportions. As an alternative to such track scales, it is also a common practice to have a pair of sliding tapes, corresponding respectively to the lensboard and copyholder positions, which are read at the rear of the camera, and which are marked in accordance with computations made with respect to a lens of specific focal length, and intended to indicate the settings for photographic proportions.

In systems using such track scales or marked sliding tapes, or in other fixed systems that are calibrated for a specific focal length, any stretch, play, or maladjustment relating to the scales or the means by which they are read, as well as any alteration or change relating to the lens, such as defective reassembly or remounting after cleaning, or any substitution or replacement with another lens, will introduce inaccuracies of size ratios, or focus, or both.

This invention differs from the above described means and methods of adjusting the lensboard and copyholder components of the conventional camera principally, but not entirely, in the respect that it does not depend on computations or calibrations for a specific focal length lens, but uses the actual optical image formed by any appropriate lens for the visual determination of size ratios.

A brief description of the optical means of the invention is as follows. Appropriate fixed index lines are incorporated with the copyholder of the camera, and are projected by the camera lens onto an appropriate fractionally calibrated percentage scale incorporated with the ground glass of the camera. This projected image, when properly focused and superposed on said percentage scale, will give a direct visual reading, expressed in percentage, of the proportions of the original copy to its reproduced size. A similar system is preferably included for indicating the dimensional alteration of linear measurements in increments of fractions of an inch or other linear system. The percentage and linear scales are so arranged that they can be used separately or in conjunction with each other for the determination of enlargements, reductions, as well as same reproduction size. Thus, each scale can be simultaneously interpreted in terms of the other; for instance, an indicated enlargement to 200% on the percentage scale will also indicate, on the linear scale, that 6 inches has been enlarged to 12 inches; in like manner, an indicated reduction from 8 inches to 4 inches on the linear scale, will also indicate, on the percentage scale, a reduction to 50%. Thus, within the limits of the extensions of the lensboard and copyholder, irrespective of the lens being used, the camera can be adjusted for same size or any desired size ratio while viewing the image on the ground glass, and the usual procedures for photographing copy onto film, or other suitable material, will result in an image of the desired size.

A standard graphic arts camera, equipped with the new accessory scales, is illustrated on the accompanying drawings, in which, FIG. 1 is a plan view of the camera, copyholder and track therefor;

FIG. 2 is a side elevation of FIG. 1;

FIG. 3 is an end view of the back of the camera, showing the hinged, focusing ground glass, with the scale thereon, in closed or viewing position, and with the hinged, film door in open position;

FIG. 4 is an elevation, to larger scale, of a conventional, glass-faced copyholder with the new linear scale and percentage marks applied thereto;

Figure 5:
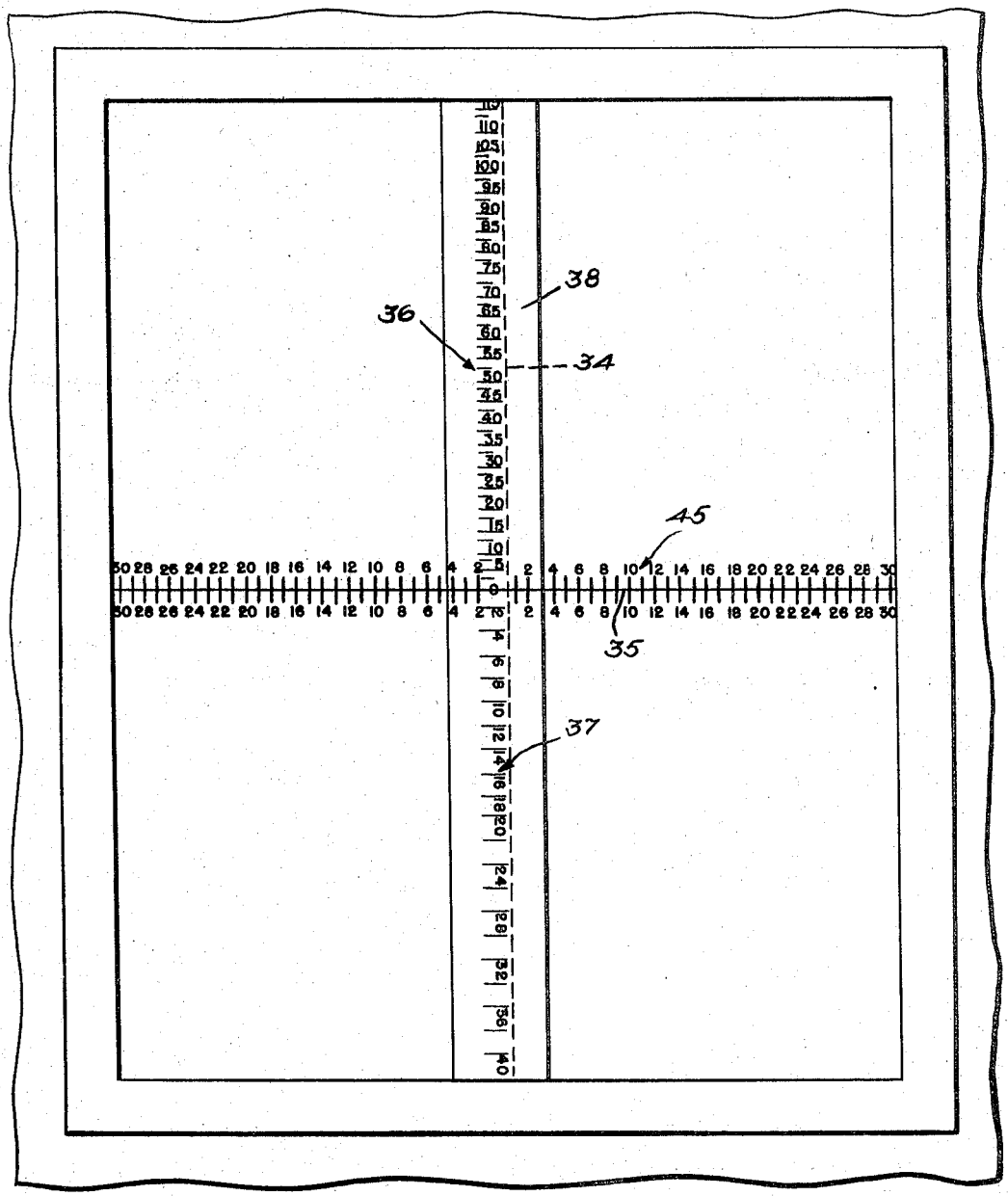
FIG. 5 is a fragmentary elevation of the inner surface of the ground glass as viewed through the outer or rear surfaces thereof, with the linear and percentage scales applied thereto.

The standard or conventional graphic arts camera, chosen for the purpose of illustration in FIGS. 1 to 3, and generally indicated at 11, comprises a rear case 12 normally mounted behind the wall 13 of a dark room, and carrying a hinged door 14 for the ground glass 14', and a hinged door 15 for a vacuum film holder 16 which is closable to the same plane as the ground glass; a bellows 17 provided with a lens board 18 having a base 19 slidable along a trackway 20, and having a lens mounting 21 permitting lateral and vertical movement in its normal plane; a copyholder 22 mounted in a frame 23 pivoted in a carriage 24 having a base 25 slidable on the trackway 20; and handwheels 26 associated with shafts and gearing (not shown) for moving the lens mounted on the lensboard and the copyholder longitudinally relative to each other and to the ground glass, for focusing.

Linked arms 27 pivotally mounted adjacent the copyholder may be provided to carry arc lamps or other light sources for illuminating the copy on the copyholder which usually has a series of rectangular outlines 28 (FIG. 4) marked on its surface for readily centering the copy, as well as vertical and horizontal axis lines, 29 and 30.

It will be understood that the structural details of the camera are immaterial to the present invention which may be practiced with any graphic arts camera having a ground glass and film holder alternately locatable in the same plane, a movable lens mounted on a movable lensboard and a movable copyholder, with means for moving said components, manually or mechanically.

Figure 7:
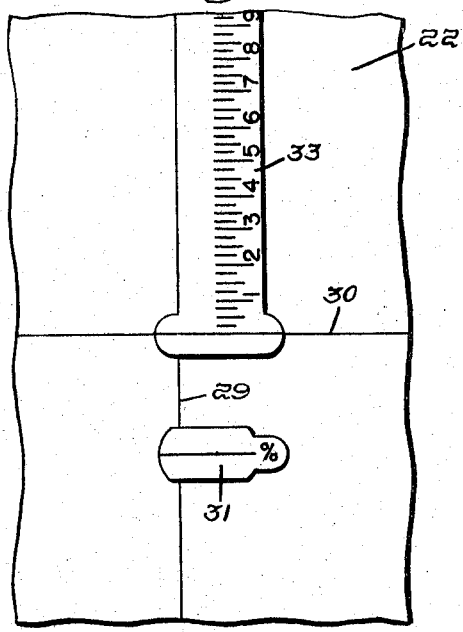
FIG. 7 is an enlarged, fragmentary view of the linear scale and one of the percentage indices on the copyholder as shown in FIG. 4.

In accordance with the invention, a dimensionally stable surface for the copyholder 22 is provided with index lines 31 and 32, photomechanically or otherwise applied to said surface; index 31 representing a 10% line, and index 32 representing a 100% line; and said surface preferably has applied thereto a linear scale 33, having index lines regularly spaced to represent inches, fractions of inches, or other predetermined dimensions. The percentage indices are preferably spaced at predetermined intervals below the horizontal axis 30 of the vertically erected copyholder, and along one side of the vertical axis 29 thereof. The linear scale is on or preferably slightly offset from the vertical axis, and each scale has its zero reference line registered with the horizontal axis (FIGS. 4 and 7).

Figure 9:
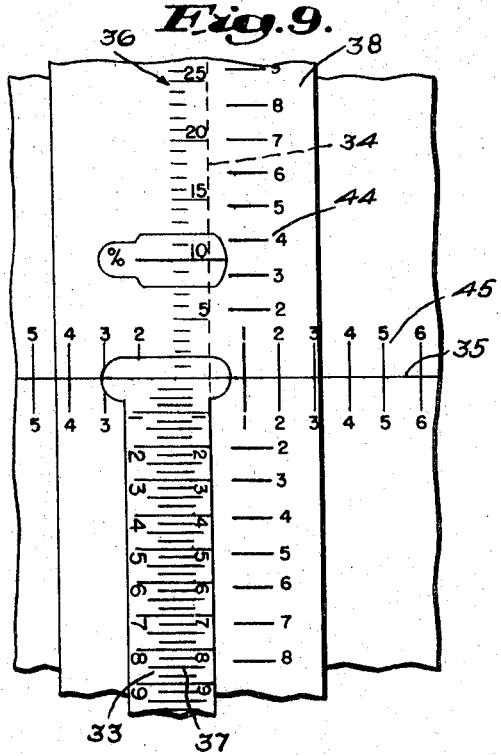
FIG. 9 is a similar enlarged view of the superposed scales on the ground glass as shown in FIG. 6.
Figure 10:
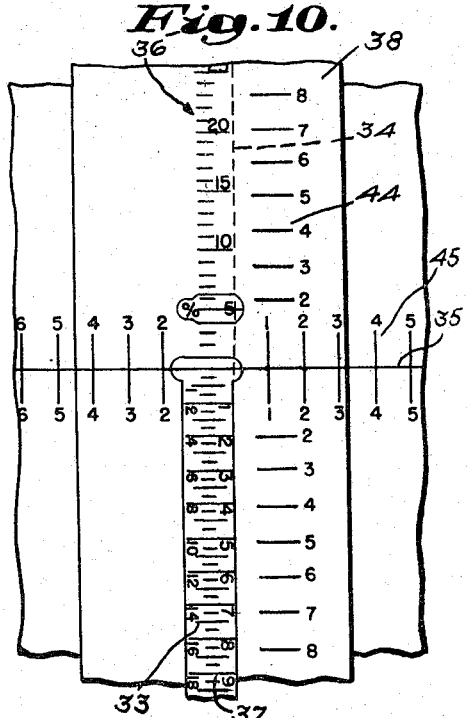
FIG. 10 is a view similar to FIG. 9 but showing the relationship of the superposed scales in a 50% copy-to-image ratio.

The ground glass 14' conventionally has vertical and horizontal axis lines, 34 and 35, and these axes normally have linear scales 44 and 45, respectively, reading outwardly from their intersection, as shown in FIGS. 9 and 10, to indicate the film size required to include a desired image and to assist in centering the image of the copy while focusing the camera.

Figure 8:
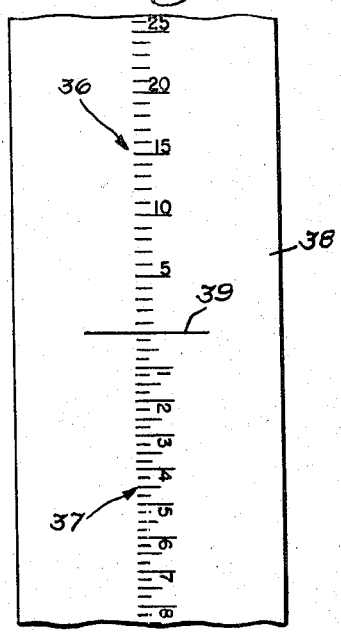
FIG. 8 is a similar enlarged fragmentary view of the scales on the ground glass, as shown in FIG. 5.

Pursuant to this invention, a percentage scale 36, graduated in percentage units, is applied to the inner or lens side of the ground glass, parallel to the vertical axis line thereof, and preferably complemental to the percentage indices on the copyholder, with the zero reference line of the scale registering with the horizontal axis line 35; and a linear scale 37 is aligned with the vertical axis 34 and preferably complemental to the linear scale on the copyholder, on the opposite side of the horizontal axis line. The indicia of both scales on the ground glass is preferably applied, in a transparent color contrasting with the color of the percentage indices and scale on the copyholder, to a narrow transparent plastic film strip, or the like 38 (FIG. 8), which is suitably applied to the ground glass, and which has a horizontal center reference line 39 (the zero line of both scales) to be registered with the horizontal axis line 35. The spacings of the 10% and 100% lines on scale 36 and of the linear scale 37 correspond, respectively, with the spacing of the percentage indices 31 and 32 and the linear scale 33 on the copyholder.

Figure 6:
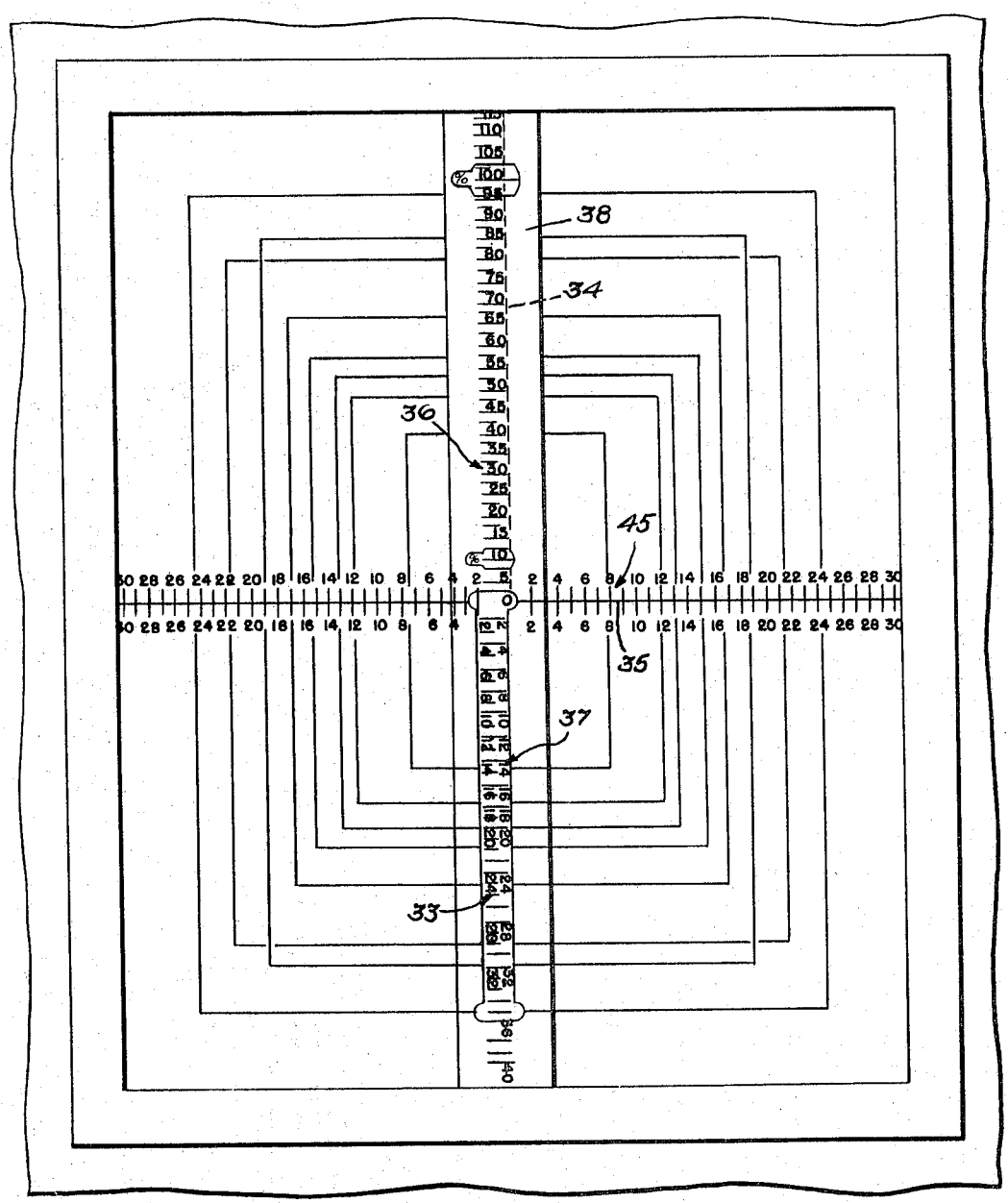
FIG. 6 is a view similar to FIG. 5, showing the image of the scale and marks of the copyholder superposed upon the scales of the ground glass in a 100% copy-to-image ratio.

Thus, when the image of the linear scale and percentage indices on the copyholder is projected through the camera lens onto the focusing ground glass, in optically reversed position, the image of the percentage indices 31 and 32 is superposed upon the percentage scale 36, and the image of the linear scale 33 is aligned with the linear scale 37, as shown in FIG. 6 which shows a 100% copy-to-image ratio. This superposition or alignment furnishes a direct visual reading through the ground glass, expressed in percentage or in linear comparison, of the proportion of the copy to its reproduced size, without problems of parallax, inasmuch as the image is in the same plane as the scales on the inner surface of the ground glass. The percentage and linear scales may be used separately or in conjunction with each other for the determination of enlargements and reductions, or for reproduction in the same size as the copy.

For example, in the 100% copy-to-image ratio views of FIG. 6 and FIG. 9, the images of the 10% index 31 and the 100% index 32 of the copyholder are superposed, respectively, on the 10% graduation and the 100% graduation of the percentage scale 36 on the ground glass; and the graduations on the linear scale 33 of the copyholder are in aligned registration with corresponding graduations of the linear scale 37 on the ground glass.

That relationship of the indices and scales ensures that the copy centered on the copyholder will be photographed in the same exact size on a film centered on the vacuum film holder 16 of the camera door 15, when that door is closed to the position previously occupied by the ground glass door.

In FIG. 10, however, the image of the 10% index 31 of the copyholder is superposed on the 5% graduation of the percentage scale 36 on the ground glass, and the numbered graduations of the image of the linear scale 33 of the copyholder are in aligned registration with numbered graduations of one-half the corresponding values, of the linear scale 37 on the ground glass. It will be understood that the 100% index 32 (not shown in FIG. 10) is simultaneously superposed on the 50% graduation of the percentage scale 36, and provides a direct visual reading without interpolation. This relationship of the indices and scale indicates a copy-to-image ratio of 50% and ensures that the copy centered on the copyholder will be photographed one-half size on a film centered on the film holder 16 of the closed door 15.

It will be apparent that if the image of the 10% index 31 of the copyholder should be superposed on the 20% graduation of the percentage scale 36 on the ground glass, the copy-to-image ratio would be 200%; and the graduations of the linear scale image 33 of the copyholder will be aligned with graduations of the ground glass linear scale 37 which are twice the value of the image graduations. In such cases, the photograph of the copy would be enlarged exactly twice size. It will be also apparent that any other copy-to-image ratio may be indicated by other relationships of the superposed percentage indices, or of the superposed linear scales, as viewed on the ground glass.

Hence, when a predetermined copy-to-image ratio of reproduction is desired, the image of the percentage indicia and linear scale applied to the copyholder, as aforesaid, is viewed in relation to the scales on the ground glass of the camera, and the relative positions of the camera lens and the copyholder are adjusted by turning one or both of the respective handwheels 26 at the back of the camera, to move the lensboard 18 or the copyholder 22, or both, until the image is in focus and the percentage indicia and the linear scales are in correct relation, as viewed on the ground glass, to ensure the desired copy-to-image ratio, so that a photograph of the actual copy will be proportionately enlarged or reduced, or reproduced in the same size, as intended.

In the event that a sufficiently large change of size causes a lateral displacement of the projected image on the ground glass for convenient reading, the image may again be brought into proper position by lateral movement of the lens mount; this adjustment will not affect the accuracy of the system. In similar manner, if the camera tracking is not true, or if the copyholder, lens, and ground glass are not perfectly aligned, there may be a horizontal and/or vertical displacement of the image, in which case the appropriate movement of the lens mount will adjust the image to its proper position on the ground glass. Before making the exposure, the image of the axes of the copyholder should be checked for alignment with the ground glass axes to assure that the copy will be centered.

Although the dimensional spacing of the percentage indices, of the primary graduations of the linear scale of the copyholder, and of the scales on the ground glass, may be determined arbitrarily, I have found it convenient and satisfactory for ordinary purposes of range, legibility and integer subdivision to space the integer percentage indications at ½ pica or approximately 12 per inch, and to space the integer linear graduations one-half inch apart; it being understood that the spacings of the indices and scale on the copyholder must be the same as the corresponding spacings of the scales on the ground glass.

I have also found that the comparative view on the ground glass is more legible when the indicia or scales on the copyholder are black on a light colored opaque background, and when the scales on the ground glass strip 38 are in red on a transparent background; the lines and numerals of the ground glass scales preferably being transparent also.

The factory inscribed axis lines and graduations on the ground glass, such as 34 and 35 of FIGS. 9 and 10, are usually of a red color. When the red vertical axis 34 is graduated and numbered across the axis, the graduations and numbers may be removed along one side of the axis, so that they will not affect the legibility of the percentage and linear scales on the ground glass.

In keeping with good practices of photography, the overall surface of the copyholder preferably presents a uniform black color to the lens so that glare and unwanted reflected light may be held to a minimum. It is understood that any necessary markings on said surface be kept in a light color for purposes of legibility and utility.

In case a camera is equipped with a transparency copyholder back, so that the light source projects light through the back of the copyholder toward the lens to illuminate a transparency copy, the indicia on the copyholder should also be transparent, rather than opaque as on the ordinary copyholder which is illuminated from the front or lens side. A suitable pin system, or other registering device, may be used to reposition the indicia or scale, if they should become temporarily displaced from the transparency back.

As previously explained, the practice of my invention ensures, by visual observation and manual-mechanical adjustment of the camera lens and the copyholder extensions, an accurate photographic reproduction of a copy in any feasible proportionate size, and obviates the inaccuracies characteristic of prior practices, and due to miscalculations of conversions of dimensional changes to percentages, backlash of adjustment gears, stretching of adjustment tapes, inaccurate carriage settings due to parallax, or other causes.

My invention may, nevertheless, be practiced with conventional cameras, irrespective of the focal length of its lens, without removing any arrangements previously installed for the purpose of focusing or setting copy-to-image ratios.

It will be appreciated that the percentage indices 31 and 32 constitute a percentage scale; that either the percentage scales or the linear scales, on the copyholder and on the ground glass, may be employed separately, or together as herein disclosed; and that such scales may be applied along the horizontal axes of the copyholder and the ground glass, instead of along the vertical axes thereof, with their zero reference lines located at the vertical axes instead of at the horizontal axes. It will also be understood that the image of either scale as viewed on the ground glass may be superposed on the complemental ground glass scale or in adjacent registration therewith, so long as the graduations on complemental scales correspond in value.

I claim:

1. In a graphic arts camera having a ground glass, a longitudinally movable lensboard and a longitudinally movable copyholder, a scale applied to the inner surface of the ground glass at one side of a major axis thereof, a corresponding scale applied to the copyholder at a complemental side of a major axis thereof, whereby the image of the copyholder scale may be viewed in superposed relation to the ground glass scale, and means for adjusting the relative extensions of the lensboard and the copyholder, so that said extensions may be adjusted according to the copy-to-image ratio visually observable by the relative registration of indices of the superposed scales on the ground glass.

2. Apparatus as described in claim 1, the scales being graduated in corresponding linear increments.

3. Apparatus as described in claim 1, the scales being graduated in corresponding percentage increments.

4. Apparatus as described in claim 3, the ground glass and the copyholder also having corresponding linear scales, in alignment with the respective percentage scales and on the opposite sides of the respective axes.

5. Apparatus as described in claim 4, the percentage scales and the linear scales being located parallel to the vertical axes of the ground glass and the copyholder, respectively, and having zero reference lines in registration with the horizontal axes thereof, respectively.

6. In a graphic arts camera having a ground glass, a longitudinally movable lensboard and a longitudinally movable copyholder, a scale applied to the inner surface of the ground glass, a corresponding scale applied to the copyholder in alignment with and in a position to be viewed in superposed relation to the scale on the ground glass, and means for adjusting the relative longitudinal positions of the lensboard and the copyholder according to the copy-to-image ratio visually observable by the relative registration of indices of the superposed scales on the ground glass.

References Cited by the Examiner

FOREIGN PATENTS 258,023  4/1949  Switzerland.

NORTON ANSHER, *Primary Examiner.*

R. A. WINTERCORN, *Assistant Examiner.*